(12) United States Patent
Gadi et al.

(10) Patent No.: US 10,713,759 B2
(45) Date of Patent: Jul. 14, 2020

(54) DENOISING AND/OR ZOOMING OF INSPECTION IMAGES

(71) Applicant: Smiths Heimann SAS, Paris (FR)

(72) Inventors: Najib Gadi, Paris (FR); Pascal DeSaute, Paris (FR); Irene Dorion, Paris (FR)

(73) Assignee: SMITHS HEIMANN SAS, Vitry-sur-Seine, Paris (FR)

( * ) Notice: Subject to any disclaimer, the term of this patent is extended or adjusted under 35 U.S.C. 154(b) by 110 days.

(21) Appl. No.: 15/761,927

(22) PCT Filed: Sep. 23, 2016

(86) PCT No.: PCT/GB2016/052977
§ 371 (c)(1),
(2) Date: Mar. 21, 2018

(87) PCT Pub. No.: WO2017/051194
PCT Pub. Date: Mar. 30, 2017

(65) Prior Publication Data
US 2018/0260937 A1 Sep. 13, 2018

(30) Foreign Application Priority Data
Sep. 25, 2015 (GB) .................................. 1517014.5

(51) Int. Cl.
*G06T 5/00* (2006.01)
*G06T 11/00* (2006.01)
(Continued)

(52) U.S. Cl.
CPC ............ *G06T 5/002* (2013.01); *G06T 3/4007* (2013.01); *G06T 7/30* (2017.01); *G06T 11/005* (2013.01); *G01N 2223/401* (2013.01)

(58) Field of Classification Search
CPC ......... G06T 11/005; G06T 5/002; G06T 7/30; G06T 3/4007; G01V 5/0091; G01T 7/00
(Continued)

(56) References Cited

U.S. PATENT DOCUMENTS 6,269,142 B1 * 7/2001 Smith .............. G01N 23/20083
378/160
7,187,794 B2    3/2007 Liang et al.
(Continued)

FOREIGN PATENT DOCUMENTS

EP    2169592 A1    3/2010
EP    2533197 A2    12/2012

OTHER PUBLICATIONS

Zhang, B. et al., "Multiscale Variance-Stabilizing Transform for Mixed-Poisson-Gaussian Processes and its Applications in Bioimaging", IEEE International Conference on Image Processing, 2007, vol. 6, pp. 233-236.
(Continued)

*Primary Examiner* — Ali Bayat
(74) *Attorney, Agent, or Firm* — Kevin E. West; Advent, LLP

(57) ABSTRACT

In one aspect, there is provided a method of denoising one or more inspection images comprising a plurality of pixels, comprising: receiving an inspection image generated by an inspection system configured to inspect one or more containers, the inspection image being corrupted by a Poisson-Gaussian noise and a variance of the noise being non-constant in the plurality of pixels, and denoising the received inspection image by applying, to the inspection image, a variance-stabilizing transformation for transforming the variance of the noise into a constant variance in the plurality of pixels, wherein the variance-stabilizing transformation is
(Continued)

based on a descriptor associated with the angular divergence of the inspection radiation and the Poisson-Gaussian noise.

19 Claims, 10 Drawing Sheets

(51) Int. Cl.
  *G06T 7/30* (2017.01)
  *G06T 3/40* (2006.01)
(58) Field of Classification Search
  USPC .......................................................... 382/264
  See application file for complete search history.

(56) References Cited

U.S. PATENT DOCUMENTS

| | | | |
|---|---|---|---|
| 2008/0002810 A1* | 1/2008 | Slaughter | G01T 3/00 378/57 |
| 2012/0019512 A1* | 1/2012 | Yang | G06T 11/005 345/419 |
| 2014/0177932 A1* | 6/2014 | Milne | G01N 21/9027 382/128 |
| 2014/0211910 A1 | 7/2014 | Subramanian et al. | |
| 2015/0060686 A1* | 3/2015 | DeVolpi | G01T 3/00 250/390.1 |
| 2017/0242148 A1* | 8/2017 | Yu | G01F 17/00 |

OTHER PUBLICATIONS

Search Report dated Feb. 18, 2016 for GB Application No. GB1517014.5.

Makitalo, M. et al. "Optimal Inversion of the Generalized Anscombe Transformation for Poisson-Gaussian Noise", IEEE Transactions on Image Processing, vol. 22, No. 1, Jan. 1, 2013, pp. 91-103.

Makitalo, Markku et al., "Poisson-gaussian denoising using the exact unbiased inverse of the generalized anscombe transformation", 2012 IEEE International Conference on Acoustics, Speech and Signal Processing, Mar. 25, 2012, pp. 1081-1084.

International Search Report dated Dec. 19, 2016 for PCT/GB2016/052977.

* cited by examiner

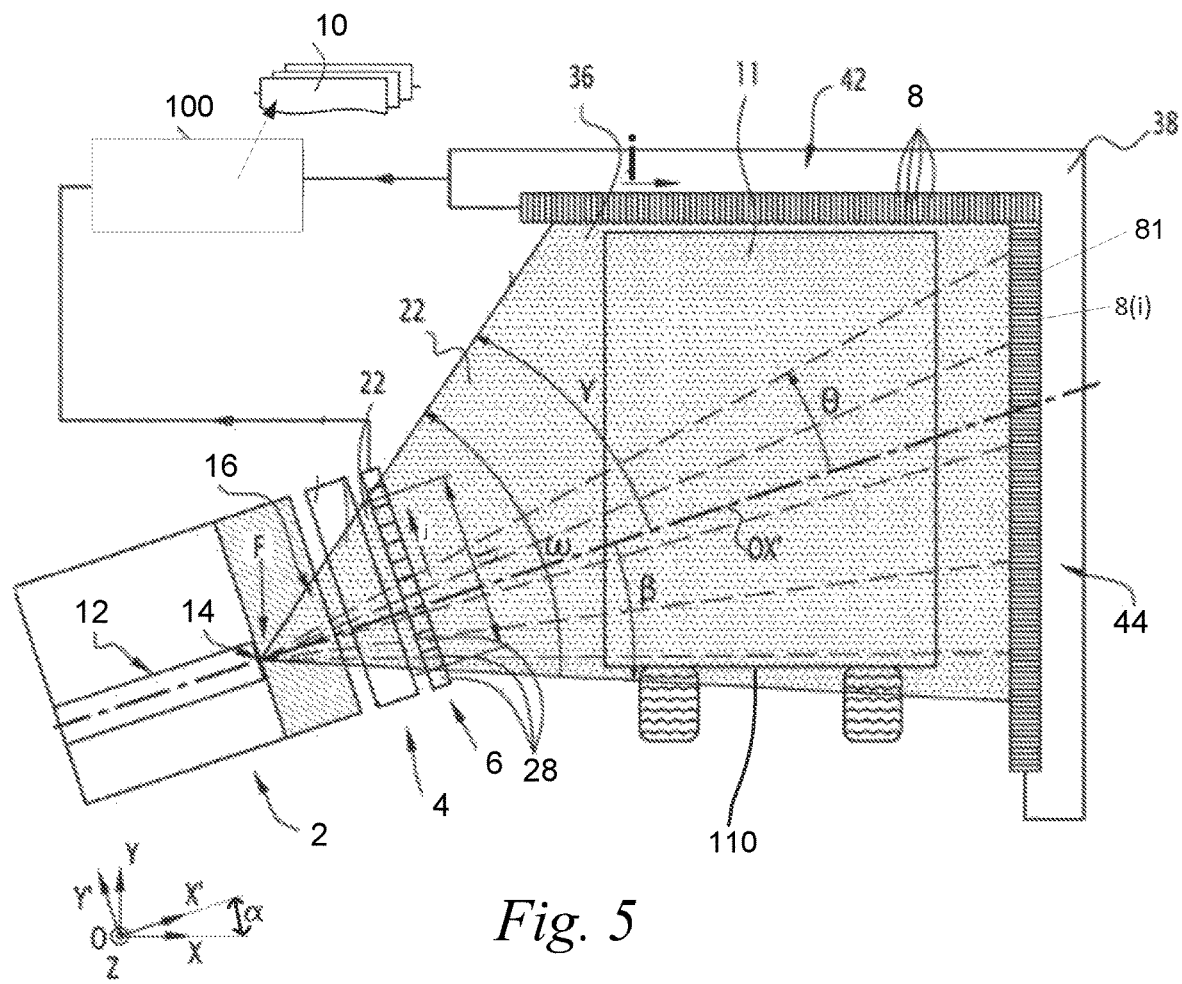
Fig. 5
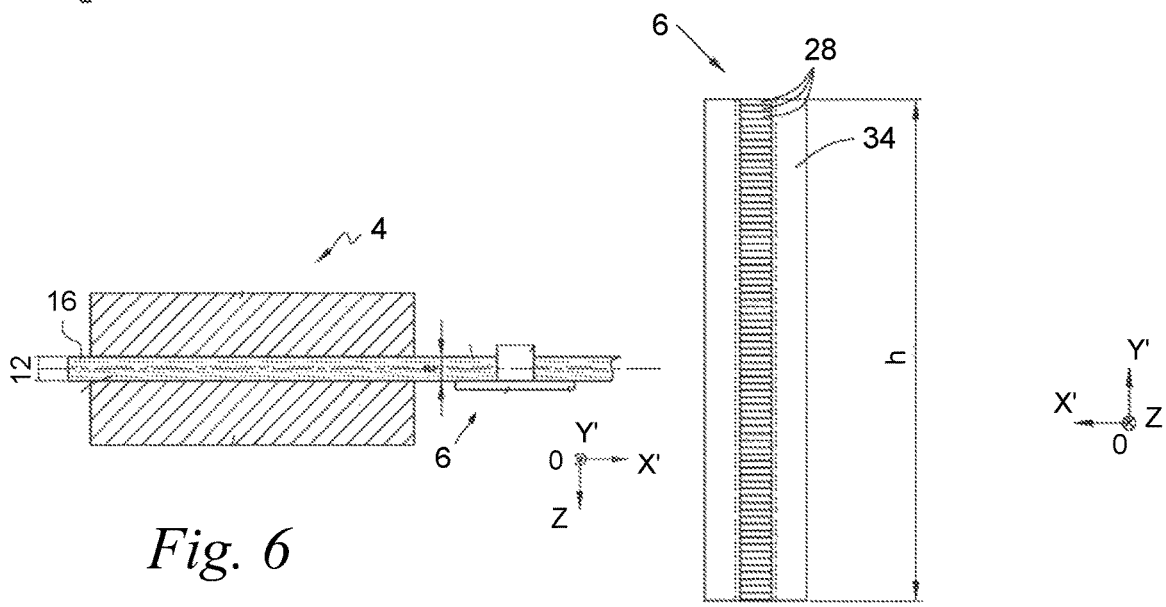
Fig. 6
Fig. 7

DENOISING AND/OR ZOOMING OF INSPECTION IMAGES

FIELD OF THE INVENTION

The present disclosure relates, but is not limited, to methods and systems for denoising and/or zooming one or more inspection images, or at least a part of at least one inspection image.

BACKGROUND

It may be difficult for a user to detect hidden objects, such as weapons or dangerous material, in inspection images, particularly when the images are corrupted by noise. This is particularly true when the inspection images are generated by an inspection system with small radiation (such as x-ray) doses, as the SNR (Signal-to-Noise Ratio) may be small.

Zooming in the corrupted images usually does not help the user in detecting the hidden objects, because the noise corrupting the images is also enlarged by the zooming. Aspects of the present invention address some of the above issues.

SUMMARY OF INVENTION

Aspects and embodiments of the invention are set out in the appended claims. These and other aspects and embodiments of the invention are also described herein.

PRESENTATION OF THE FIGURES

Embodiments of the disclosure will now be described, by way of example only, with reference to the accompanying drawings, in which:

FIG. 5 shows an example inspection system, in side and sectional views;

FIG. 6 is a top view of a radiation source and a reference block of the system shown in FIG. 5;

FIG. 7 shows the reference block illustrated in FIG. 6 in side view;

DESCRIPTION OF EXAMPLE EMBODIMENTS

Overview

Figure 1:
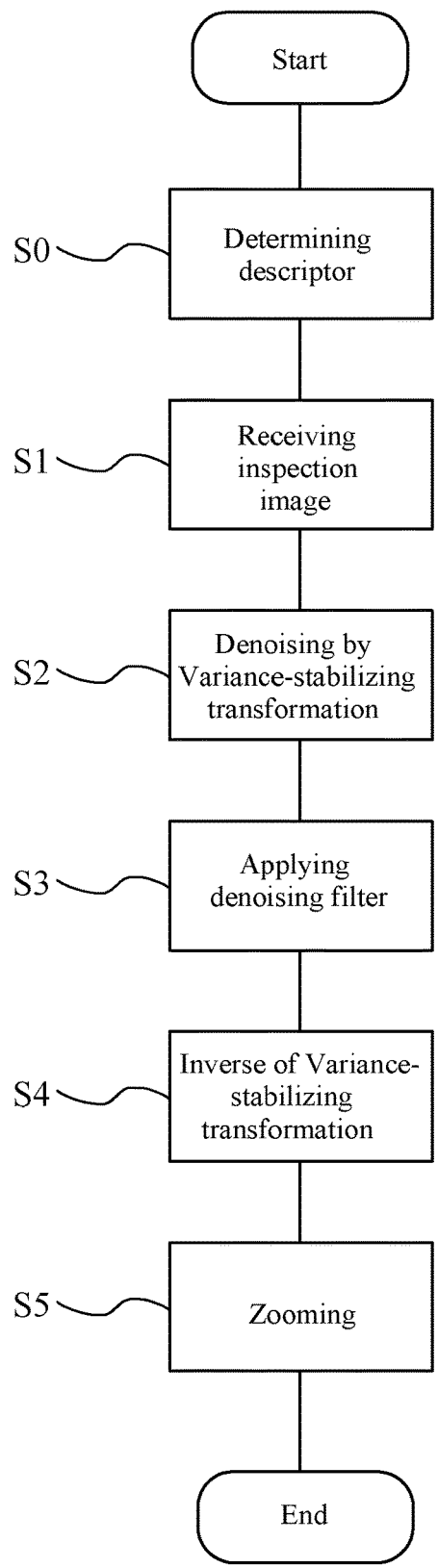
FIG. 1 is a flowchart that illustrates an example method for denoising and/or zooming inspection images.

FIG. 1 is a flowchart that illustrates an example method of denoising one or more inspection images, or at least a part of at least one inspection image.

Figure 2:
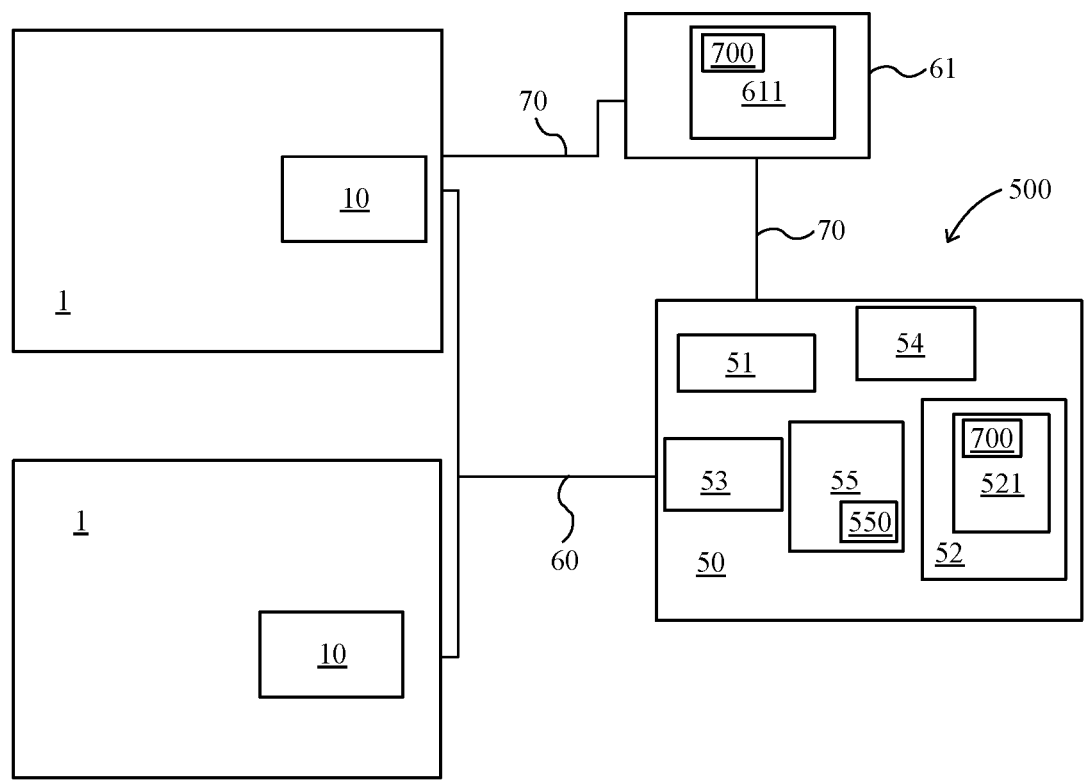
FIG. 2 is a very diagrammatic view which illustrates an example denoiser and/or zoom configured to be connected to an inspection system.

FIG. 2 very diagrammatically illustrates an apparatus 500 comprising a denoiser and/or zoom 50 configured to implement at least some of the steps of the method illustrated by FIG. 1.

In some examples, the inspection images may be generated by an inspection system 1 configured to inspect one or more containers which comprise a load. An example of the inspection system will be described in greater detail below with reference to FIGS. 5 to 7.

As described in greater detail below, the inspection system 1 may be configured to inspect the container by transmission, through the container, of inspection radiation (e.g. x-ray) and may be configured to detect the transmitted radiation on an inspection radiation receiver comprising a plurality of detectors. In some examples, the inspection radiation may be transmitted in successive pulses of radiation. As will be apparent in the present disclosure, the inspection radiation may have an angular divergence from an inspection radiation source to the inspection radiation receiver.

The inspection system 1 may have certain instabilities, e.g. the inspection radiation source may not be stable over time and may experience an evolution in the intensity of the inspection radiation during the inspection and/or in the spectral properties of the inspection radiation.

The noise may be important for inspection carried out with small doses of radiation (such as from 2 mGy to 60 mGy, typically 20 mGy for example). An example of an inspection image 10 having a plurality of pixels 13 is illustrated by FIG. 3A.

Figure 3A:
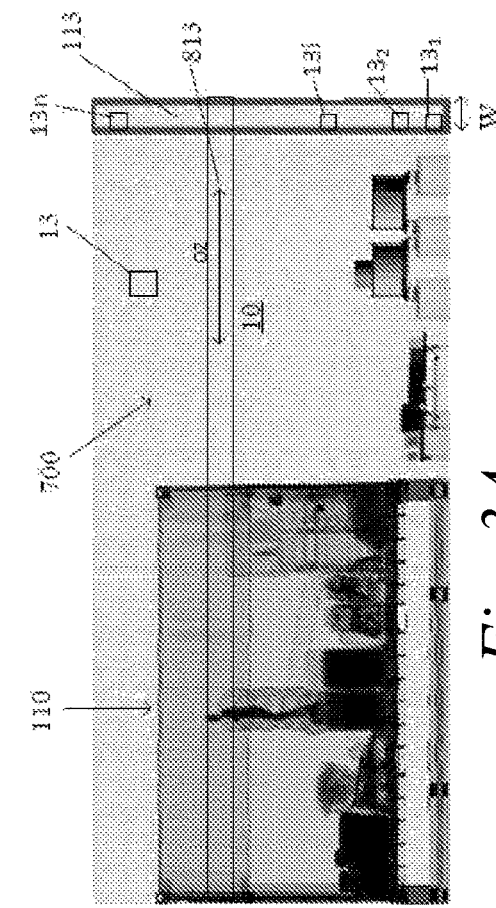
FIG. 3A shows an example of an inspection image corrupted by a Poisson-Gaussian noise.

FIG. 3A shows that the inspection image 10 may be corrupted by a Poisson-Gaussian noise.

Figure 3B:
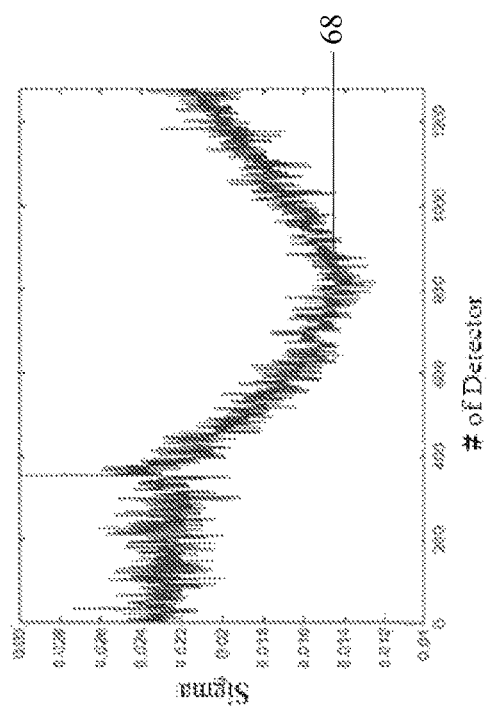
FIG. 3B shows an example of a variation of a time standard deviation of the noise corrupting the inspection image of FIG. 3A, as a function of a detector in the system.

A graph of a standard deviation (i.e. the square root of a variance) of the noise of FIG. 3A, as a function of the detectors associated with the pixels 13 in the inspection image 10, is illustrated by FIG. 3B. The graph of FIG. 3B shows a trough 68 in the curve. The trough 68 of FIG. 3B illustrates that the variance (the standard deviation of FIG. 3B, squared) of the noise is non-constant in the detectors, and thus in the image.

The inspection image 10 generated by the inspection system 1 is thus fundamentally different compared to a natural image (such as an image captured by known CCD and/or CMOS cameras), as the natural image may be corrupted with a noise having a constant variance in the natural image.

Figure 4A:
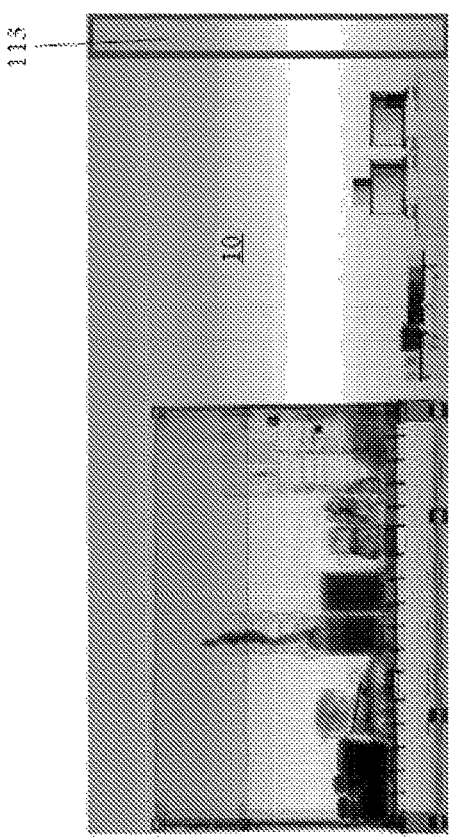
FIG. 4A shows an example of an inspection image obtained after a variance-stabilizing transformation has been applied to the image of FIG. 3A.
Figure 4B:
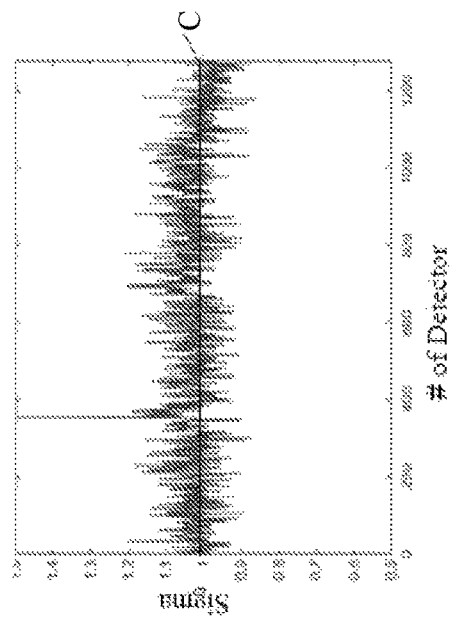
FIG. 4B shows an example of a variation of a time standard deviation of the noise corrupting the inspection image of FIG. 4A, as a function of the detectors in the system.

The method illustrated by FIG. 1 may thus comprise, at S2, denoising the received inspection image by applying, to the inspection image, a variance-stabilizing transformation for transforming the variance of the noise into a constant variance in the image. FIG. 4A illustrates an example of a transformed image obtained by applying the transformation. FIG. 4B shows a graph of a standard deviation (i.e. the square root of the variance) of the noise corrupting the transformed image illustrated by FIG. 4A, as a function of the detectors associated with pixels in the transformed image. FIG. 4B shows that the standard deviation may be approximated by a constant C (e.g. equal to 1), and the variance may thus also be approximated by a constant (also e.g. equal to 1).

In some examples, the variance-stabilizing transformation may be based on a descriptor associated with the angular divergence of the inspection radiation and the Poisson-Gaussian noise. In some examples the descriptor may be based on a predetermined set of parameters.

In the example of FIG. 2, the denoiser and/or zoom 50 comprises a processor 51, a memory 52, a first communication interface 53 and a second communication interface 54, and a Graphical User Interface 55 comprising a display 555 for displaying the inspection images 10 to the user. In some examples, the denoising and/or zooming may be performed, at least partly, by the denoiser and/or zoom 50, e.g. by the processor 51 of the denoiser and/or zoom 50.

The memory 52 is configured to store data, for example for use by the processor 51. The memory 52 may comprise a first database server 521.

In FIG. 2, the denoiser and/or zoom 50 is configured to communicate with one or more inspection systems 1, via the interface 53 and a first link 60 of the apparatus 500, the link 60 being located between the interface 53 and each one of the systems 1. The link 60 may comprise a communication network (wired and/or wireless).

In some examples, the denoiser and/or zoom 50 of FIG. 2 may be configured to receive, at S1 of FIG. 1, the one or more inspection images 10 generated by the systems 1, from one or more systems 1, for example over the link 60. The received images 10 may be stored in the memory 52. In some examples, the memory 52 may also be configured to store data (e.g. control data) received from the systems 1 over the link 60. The database server 521 may be configured to store parameters and/or instructions and/or files, such as files corresponding to the inspection images or the parameters corresponding to the descriptor 700, for use by the denoiser and/or zoom 5.

In the example illustrated by FIG. 2, the apparatus 500 may further comprise a communication server 61, configured to communicate, via a second link 70, with some of the systems 1 and/or the denoiser and/or zoom 5 (via the interface 54). The link 70 may comprise a communication network (wired and/or wireless). In some examples, the communication server 61 may be configured to provide a remote data management system to the systems 1 and/or the denoiser and/or zoom 5. In some examples the server 61 may comprise a second database server 611. The second database server 611 may be configured to store parameters and/or instructions and/or files, such as the parameters corresponding to the descriptor 700, for use by the systems 1 and/or the denoiser and/or zoom 5.

Detailed Description of Example Embodiments

FIG. 5 shows an example of the system 1 (sometimes referred to as the "radiography equipment" hereinafter), described with reference to an orthonormal reference OXYZ, axis OY being the ascending vertical, a median plane XOY being vertical, and plane XOZ being horizontal.

The equipment 1 illustrated by FIG. 5 comprises:
the inspection radiation (e.g. x-ray) source 2 configured to generate the inspection radiation,
a collimator 4,
a reference block 6 comprising a plurality of intermediate x-ray sensors 28,
the inspection radiation receiver (42, 44) comprising the plurality of detectors 8 (sometimes referred to as the "receiving sensors" hereinafter), and
a control and signal processing device 100.

The equipment 1 of FIG. 5 is designed for the radiography of the container 110 which comprises the load 11.

The inspection radiation of FIG. 5 comprises a part 16 and a part 22. The inspection radiation shown in FIG. 5 has the angular divergence w from the inspection radiation source 2 to the inspection radiation receiver (42, 44).

The source 2 shown in FIG. 5 comprises a device for producing and accelerating an electron beam 12. The source 2 may further comprise a target 14 for the electron beam, comprising a metal (such as tungsten and copper), so as to generate the divergent part 16 of the radiation from a focal point F. The photons of the part 16 are for example generated by the so-called braking radiation effect (or "Bremsstrahlung").

The detectors 8 are positioned in the extension of the part 22 of the radiation. They delimit, with the reference block 6, an intermediate space 36 for the passage of the container 110 to be inspected.

With reference to FIG. 5, the detectors 8 are numbered by reference $8(i)$, with $0 \leq (i) \leq n$, with n a number of detectors 8 in the plurality of detectors 8, with e.g. n=1280. The detectors $8(i)$ are individually electrically connected to the control and signal processing device 100. The detectors $8(i)$ of FIG. 5 are adjacent to one another, and extend along a broken line forming a line array 81 of detectors $8(i)$, situated substantially in the median plane XOY.

Each detector 8 of FIG. 5 is capable of receiving an individual angular sector of the part 22 of the radiation after it has successively passed through the reference block 6 and the intermediate space 36 (optionally occupied by the container 110 to be inspected). The line array 81 of detectors $8(i)$ of FIG. 5 only covers a section of the container 110 to be inspected. Therefore, during an inspection, the container 110 and/or the array 81 is moved in the direction OZ (sometimes referred to the "direction of scan" herein) to obtained the 2D inspection image 10 of the container 110 (as illustrated e.g. by FIG. 3A). During the inspection, the radiation 22 thus irradiates successive sections of the container 110. Hereinafter, the successive sections are numbered using an index k. The control and signal processing device 100 illustrated by FIG. 5 is configured to form the inspection image 10 (e.g. illustrated by FIG. 3A) based on signals received from the detectors 8. As illustrated by FIG. 3A, a pixel $13(i)$ of the inspection image 10 is thus associated with the detector $8(i)$ of the receiver.

Because of the characteristics of the system 1 (for example the characteristics of the source 2), the inspection image 10 of FIG. 3A is corrupted by the Poisson-Gaussian noise and the variance of the noise is non-constant in the plurality of pixels 13 of the image 10.

In some examples, the value z(i) of the pixel 13(i) of the inspection image 10 associated with the detector 8(i) of the receiver can be defined as:

$$z(i) = \alpha(i) \cdot P(x(i)) + N(\mu(i), \sigma(i)^2) \quad (E1)$$

where: x(i) is a value of the pixel 13(i) associated with the detector 8(i), as not corrupted by the Poisson-Gaussian noise;
$\alpha(i) \cdot P(x(i))$ is associated with a Poisson noise component of the Poisson-Gaussian noise, and
$N(\mu(i), \sigma(i)^2)$ is associated with a Gaussian noise component of the Poisson-Gaussian noise.

At S2 illustrated by FIG. 1, the variance-stabilizing transformation applied to the inspection image may be based on the descriptor 700 illustrated by FIG. 3A and associated with the angular divergence w of the inspection radiation (16,22) of FIG. 5 and the Poisson-Gaussian noise corrupting the image 10 of FIG. 3A.

In some examples, the descriptor 700 may be associated with each pixel 13 of the plurality of pixels of the inspection image 10. In such an example, the descriptor 700 may take into account the Poisson-Gaussian noise of the inspection image 10 generated by the inspection system 1, the variance of which is non-homogeneous in the plurality of pixels, contrary to the variance in the noise corrupting natural images (such as images captured by known CCD and/or CMOS cameras). In such an example, the descriptor 700 may take into account at least one or more of the following instabilities of the inspection system:

the instabilities of the system 1 (such as mechanical instabilities regarding the relative position of the detector and the source) which may cause successive sections of the same container not being irradiated in the same way; and/or the instabilities of the source over time (such as from one pulse to the next), e.g. affecting the intensity of the pulses as well as the spectral properties of the radiation.

The line array 81 of detectors 8(i) of FIG. 5 is displaced in the direction of scan OZ during the inspection. In such an example, and as illustrated by FIG. 3A, a signal 813 associated with the detector 8(i) in the array 81 of detectors 8 in the direction of scan OZ is assumed to have the same signal properties in the inspection image. In such an example, the descriptor 700 associated with each pixel 13 of the plurality of pixels is simplified compared to the example where the descriptor 700 may be associated with each pixel 13 of the plurality of pixels of the inspection image 10. In the example illustrated in FIG. 3A, the descriptor 700 is associated with each pixel $13_1, 13_2, \ldots, 13(i), \ldots, 13n$, respectively associated with the n detectors 8(i). In such an example, the descriptor 700 illustrated by FIG. 3C comprises the predetermined set of parameters comprising an n×p matrix, with n the number of detectors 8 in the plurality of detectors, and p a number of parameters (sometimes referred to as "local parameters") of the variance-stabilizing transformation. In some examples, the parameters may comprise three parameters (p=3 in FIG. 3C), and the parameters may comprise the parameters $(\alpha(i), \mu(i), \sigma(i))$ associated with (E1) above.

In some examples, the method illustrated by FIG. 1 comprises, at S2, applying an Anscombe transformation f, based on the predetermined set of three parameters $(\alpha(i), \mu(i), \sigma(i))$.

In some examples, the Anscombe transformation f may be defined by, for a value z(i) of a pixel of the inspection image associated with a detector 8(i) of the receiver:

$$f(z(i)) = \begin{cases} \frac{2}{\alpha(i)} \cdot \sqrt{\alpha(i) \cdot z(i) + \frac{3}{8} \cdot \alpha(i)^2 + \sigma(i)^2 - \alpha(i) \cdot \mu(i)} \\ 0 \end{cases} \quad (E2)$$

for $$\begin{cases} z(i) > -\frac{3}{8} \cdot \alpha(i) - \frac{\sigma(i)^2}{\alpha(i)} + \mu(i) \\ z(i) \leq -\frac{3}{8} \cdot \alpha(i) - \frac{\sigma(i)^2}{\alpha(i)} + \mu(i) \end{cases}$$

with: $\alpha(i)$, a gain factor associated with the detector 8(i) of the receiver,
$\mu(i)$, a mean associated with the noise, and
$\sigma(i)$, a standard deviation associated with the noise.

An example of an Anscombe transformation of S2 is described in document "Optimal inversion of the generalized Anscombe transformation for Poisson-Gaussian noise", M. Mäkitalo and A. Foi, IEEE Trans. Image Process., vol. 22, no. 1, pp. 91-103, January 2013, the disclosure and teachings of which are hereby incorporated in their entirety by reference.

After the transformation has been applied, the transformed image is corrupted by an additive Gaussian noise.

In some examples, the method of FIG. 1 comprises determining the descriptor 700 (and e.g. the parameters $(\alpha(i), \mu(i), \sigma(i))$) during a calibration step S0, for a given inspection system 1, in order to take into account the characteristics of the system (including the radiation source).

Below are described some non-limiting example methods to determine the parameters $(\alpha(i), \mu(i), \sigma(i))$ at S0 of the method illustrated at FIG. 1.

In a first example illustrated with reference to FIGS. 8A and 8B, the descriptor 700 is determined, for the given inspection system, based on a series of calibration images generated by the given system.

Figure 8A:
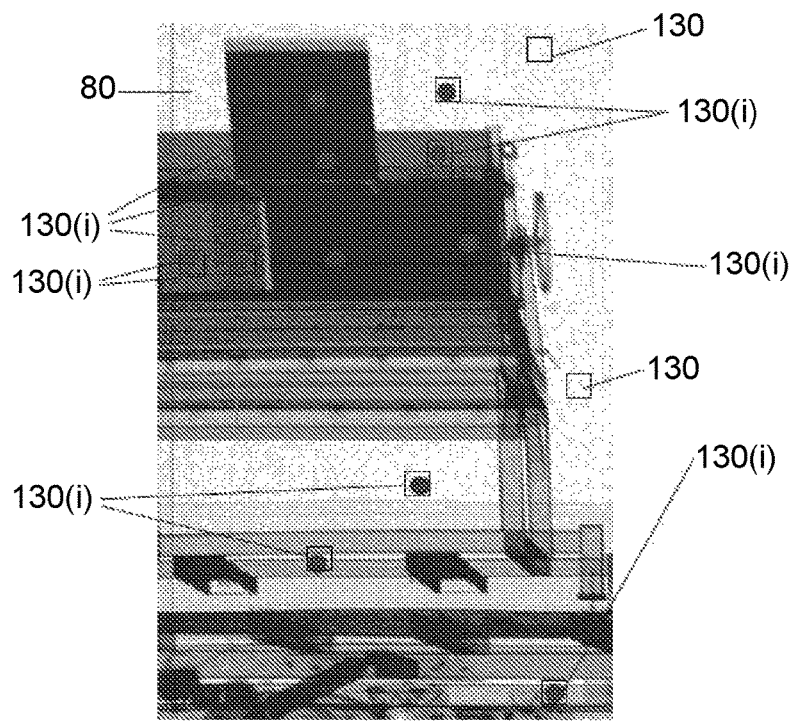
FIG. 8A shows an example of a calibration image.

FIG. 8A shows one example of a calibration image 80.

In some examples, a predetermined set of three parameters $(\alpha 1(i), \mu 1(i), \sigma 1(i))$ of the descriptor may be determined, for the given inspection system, based on the series of calibration images generated by the given system. In some examples, the determination of the predetermined set of three parameters $(\alpha 1(i), \mu 1(i), \sigma 1(i))$ of the descriptor may comprise:

obtaining a cloud of points with reference to a σ axis and a μ axis, each point of the cloud corresponding to a standard deviation σ(i) associated with a noise in a pixel (i), as a function of the mean μ(i) associated with the noise in the pixel (i), for a series of pixels in the series of calibration images; and approximating the cloud of points by a straight line, such as:

$\alpha 1(i)$ is the slope of the straight line;
$\sigma 1(i)$ is the intersection of the straight line with the σ axis; and
$\mu 1(i)$ is the intersection of the straight line with the μ axis.

The determination is explained below in greater detail.

Like the inspection images 10 generated by the given system 1, the calibration inspection image 80 shown in FIG. 8A comprises a plurality of pixels 130 corrupted by the Poisson-Gaussian noise, and the variance of the noise is non-constant in the plurality of pixels 130.

During the calibration step, the standard deviation σ(i) and the mean μ(i) of the noise are calculated for each of the pixels 130(i) illustrated in FIG. 8A. In the example illustrated by FIG. 8A, each of the pixels 130(i) corresponds to a zone of homogeneous level of grey in the calibration image 80. The standard deviation σ(i) and the mean μ(i) are calculated for example for each of the pixels 130(i) shown with a spot in FIG. 8A, e.g. for 11 pixels 130(i) of the image 80 of FIG. 8A.

Figure 8B:
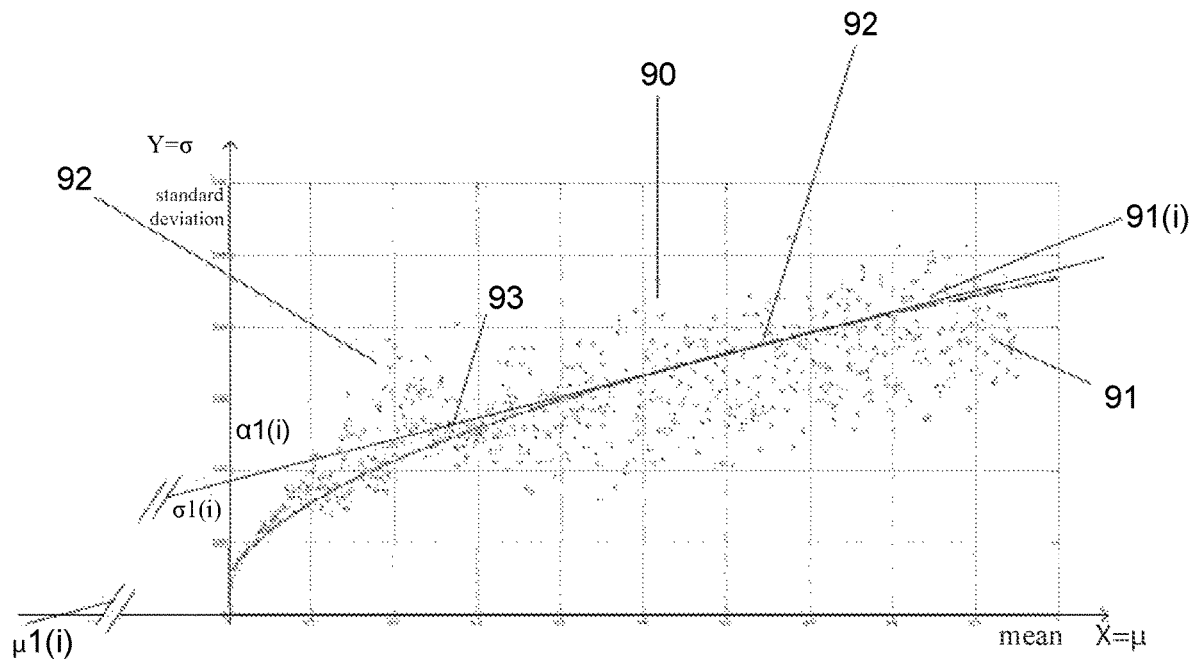
FIG. 8B shows an example of a graph representing values of a standard deviation of the noise in a pixel of the calibration image of FIG. 8A, as a function of values of a mean of the noise in the pixel.

In the example illustrated in FIG. 8B, the standard deviation σ(i) is represented as a point 91(i) as a function of the mean μ(i) of the noise in the pixel 130(i) on a graph 90, for each of the pixels 130(i). In the example of FIG. 8B, for example 11 points 91(i) corresponding to the 11 pixels 130(i) of the image 80 of FIG. 8A are represented in the graph 90 of FIG. 8B.

In some examples, the calculating and the representing may be performed for a series of calibration images 80 (for example a few tens, a hundred or a few hundreds of calibration images 80, depending on available calibration images and/or on the desired precision), the calibration images 80 being generated by the given system 1, in order to obtain the cloud 91 of points of FIG. 8B.

In some examples, the cloud of points 91 may be approximated first by a function 92 (using a fitting algorithm). In some examples, the function 92 may be approximated by a straight line 93 (using a fitting algorithm), such as:

α1(i) is the slope of the straight line 93;

σ1(i) is the intersection of the straight line 93 with the y axis (σ axis); and

μ1(i) is the intersection of the straight line 93 with the x axis (μ axis).

In some examples the cloud may be approximated directly by the straight line 93, i.e. without the use of the approximation by the function 92.

Figure 3C:
FIG. 3C shows an example of a descriptor associated with the inspection system and the Poisson-Gaussian noise corrupting the image of FIG. 3A.

It should be understood that once the three parameters (α1(i),μ1(i),σ1(i)) are determined, Equation (E1) above may be applied based on the parameters (α1(i),μ1(i),σ1(i)) to the inspection image 10 (e.g. of FIG. 6A) generated by the given system 1 such that:

$$f(z(i)) = \frac{2}{\alpha 1(i)} \cdot \sqrt{\alpha 1(i) \cdot z(i) + \frac{3}{8} \cdot \alpha 1(i)^2 + \sigma 1(i)^2 - \alpha 1(i) \cdot \mu 1(i)} \quad \text{(E2)}$$

for $z(i) > -\frac{3}{8} \cdot \alpha 1(i) - \frac{\sigma 1(i)^2}{\alpha 1(i)} + \mu 1(i)$ and $$f(z(i)) = 0 \quad \text{(E2)}$$

for $z(i) \leq -\frac{3}{8} \cdot \alpha 1(i) - \frac{\sigma 1(i)^2}{\alpha 1(i)} + \mu 1(i).$ It should be understood that in the above example, the respective parameters (α1(i),μ1(i),σ1(i)) are constant over n, i.e. all the lines of the descriptor 700 of FIG. 3C are equal.

Below is described a second non-limiting example method to determine the parameters (α(i),μ(i),σ(i)) at S0 of the method illustrated at FIG. 1.

Figure 9A:
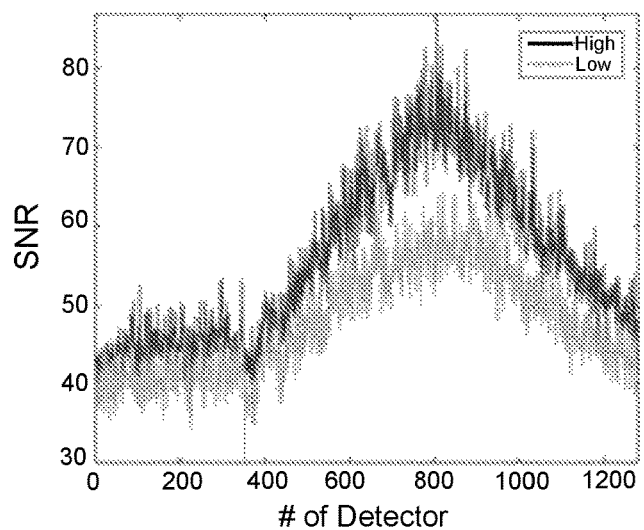
FIG. 9A is a graph showing two examples (referred to as "High" and "Low") of a Signal-to-Noise Ratio (SNR) as a function of the detectors in the system.
Figure 9B:
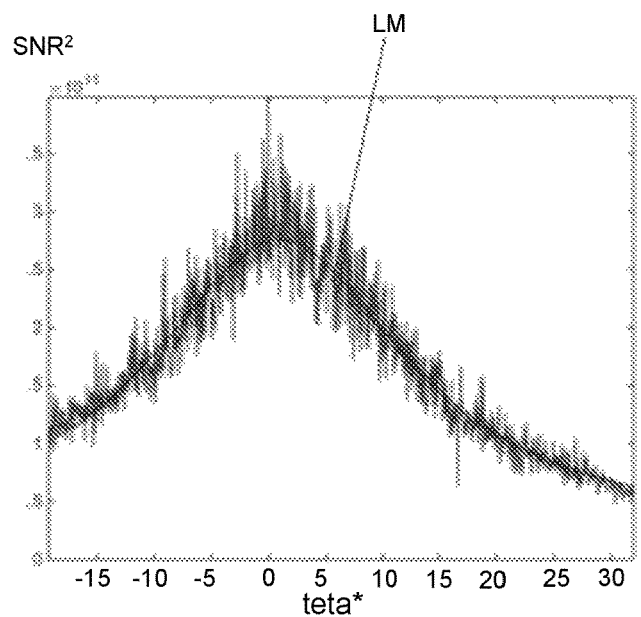
FIG. 9B is a graph showing an example of a squared Signal-to-Noise Ratio ($SNR^2$) associated with the detectors as a function of an angle θ from which the detectors are seen by the source, as well as an example approximation of the squared Signal-to-Noise Ratio ($SNR^2$)
Figure 9C:
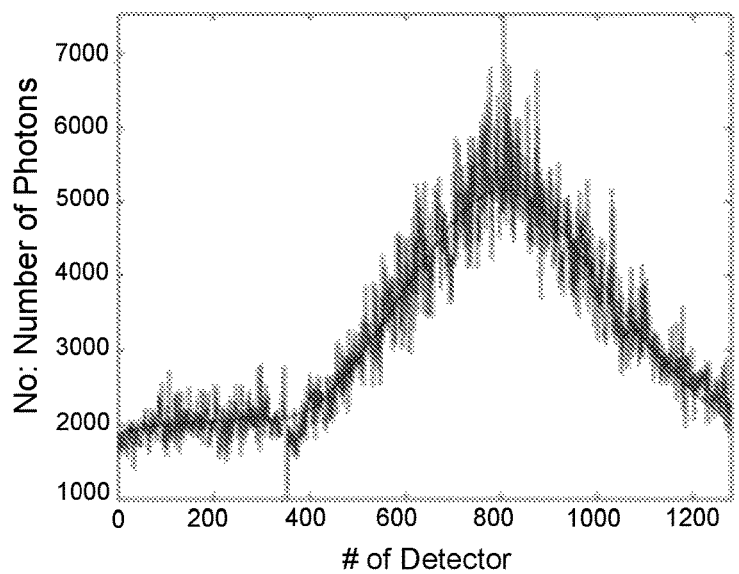
FIG. 9C is a graph showing a number of photons emitted by the source as a function of the detectors in the system, as well as an example approximation of the number of photons.

In the second example illustrated in FIGS. 9A, 9B and 9C, the method may comprise determining the descriptor (e.g. the parameters (α(i),μ(i),σ(i))) during a pre-processing step, for pre-processing images (such as raw images) associated with the detectors 8(i), i.e. generated by the system 1. In some examples, as explained in greater detail below, the pre-processing step may comprise determining at least one of:

an offset and/or an offset correction, and/or a gain and/or a gain correction, and/or a reference and/or a reference correction.

In some examples, the reference may take into account at least one of an angle of the radiation source with respect to each detector 8(i); and/or a distance from the radiation source to each detector 8(i).

As shown in (E1), σ(i) may be associated with the Gaussian noise component of the Poisson-Gaussian noise corrupting the inspection image. However, because of the characteristics of the system (including the source), a conventional definition of the standard deviation σ(i) cannot be used (e.g. it would create strip artifacts in low signal parts of the transformed image). In some examples, σ(i) may be determined by:

$$\sigma(i) = \frac{\sigma\text{off}(i)}{\text{Gain}(i)} \quad \text{(E3)}$$

with σoff(i) determined by a time standard deviation of an offset image acquired in a calibration image generated by the system, and Gain(i) determined by a time mean of an offset-corrected gain image generated by the system.

In some examples, the offset image may comprise e.g. an "open flame" image, i.e. an image generated by the inspection radiation when the container 110 is not present in the intermediate space 36 of FIG. 5. In the example of FIG. 3A, the offset image may comprise a zone 113 (sometimes referred to as "zone of gain") in an inspection image 10, for example before the container 110 passes in the median plane XOY.

The zone 113 illustrated by FIG. 3A has a width W in the direction of scan OZ created by the scan movement during the inspection. The width W corresponds to k columns of pixels 13, corresponding to successive sections of the image 10.

Below is described an example method for obtaining σoff(i).

In some examples, an offset Offset(i) for the detector 8(i) may be determined by:

$$\text{Offset}(i) = \frac{1}{k}\sum_{j=1}^{kCol} I\text{offset}(i, j), \quad \text{(E4)}$$

with Ioffset(i,j) being a value of a pixel signal of the zone 113 for detector 8(i), for column j of the zone 113.

In some examples, a variance VarOffset(i) of Offset(i) may be determined by:

$$\text{VarOffset}(i) = \frac{1}{k}\sum_{j=1}^{kCol} I\text{offset}(i, j)^2 - \text{Offset}(i)^2. \quad \text{(E5)}$$

In some examples, the standard deviation σoff(i) may be determined by:

$$\sigma\text{off}(i) = \sqrt{\text{VarOffset}(i)} \quad \text{(E6).}$$

Below is described an example method for obtaining Gain(i).

Gain(i) may be determined by the time mean of an offset-corrected gain image generated by the system. In some examples, Gain(i) may be determined by:

$$\text{Gain}(i) = \frac{1}{k} \sum_{j=1}^{kCol} Igain(i, j). \quad \text{(E7)}$$

with Igain(i,j) such that:

$$Igain(i,j) = Ioffset(i,j) - Offset(i) \quad \text{(E8)}.$$

Below is described an example method for obtaining µ(i).

µ(i) may be associated with the Gaussian noise component of the Poisson-Gaussian noise, and, after the transformation has been applied, the transformed image is corrupted by an additive Gaussian noise, and in some examples, µ(i) may be assumed to be null:

$$\mu(i) = 0 \quad \text{(E9)}.$$

(E1) shown above shows that α(i) may be associated with the Poisson noise component of the Poisson-Gaussian noise.

In some examples, α(i) may be associated with an approximation of an inverse of a number of photons emitted by the source and received by the detector 8(i). In some examples, α(i) may be determined by:

$$\alpha(i) = \frac{1}{(SNR(i))^2} \quad \text{(E10)}$$

with SNR(i), a Signal-to-Noise ratio in the pixel (i) associated with the detector 8(i) of the receiver.

FIG. 9A is a graph showing two examples (referred to as "High" and "Low") of the Signal-to-Noise Ratio (SNR) as a function of the detectors in the system. FIG. 9B is a graph showing an example of a squared Signal-to-Noise Ratio (SNR²) associated with the detectors as a function of the angle θ from which the detectors are seen by the source (see FIG. 5). FIG. 9C is a graph showing a number of photons emitted by the source as a function of the detectors in the system.

FIGS. 9A, 9B and 9C show an angular signature of the angular divergence w of the source.

FIGS. 9B and 9C show that functions representative of the angular signature of the angular divergence may be determined, for the given inspection system, to take into account the geometry of the system, the spectrum of the inspection radiation and the spectral sensitivity of the detectors 8 (and for the spectral sensitivity of the intermediate sensors 28 of the reference block 6). The representative functions may be determined either experimentally or through simulation calculations.

In the example of FIG. 9B, the squared Signal-to-Noise Ratio (SNR²) may be approximated by a Lorentz model LM, such that:

$$r_{Lf}(i)^2 \cdot SNR(i)^2 = \frac{a}{1 + b \cdot (\theta_L(i) - c)^2} + d \quad \text{(E11)}$$

with a, b, c and d being determined by the Lorentz model of the angular signature of the angular divergence of the source, as represented in FIG. 9B, and with $r_{Lf}(i)$ a moving average of a source-pixel distance.

In some examples, the Lorentz model illustrated by FIG. 9B may be determined using a minimization algorithm in order to fit the model parameters a, b, c and d to the data in FIG. 9B. In some examples, the Lorentz model may be determined by using possible angular signatures depending on the energy of the radiation and by calculating the most probable energy of the angular signature using scalar product distance processing.

Figure 10:
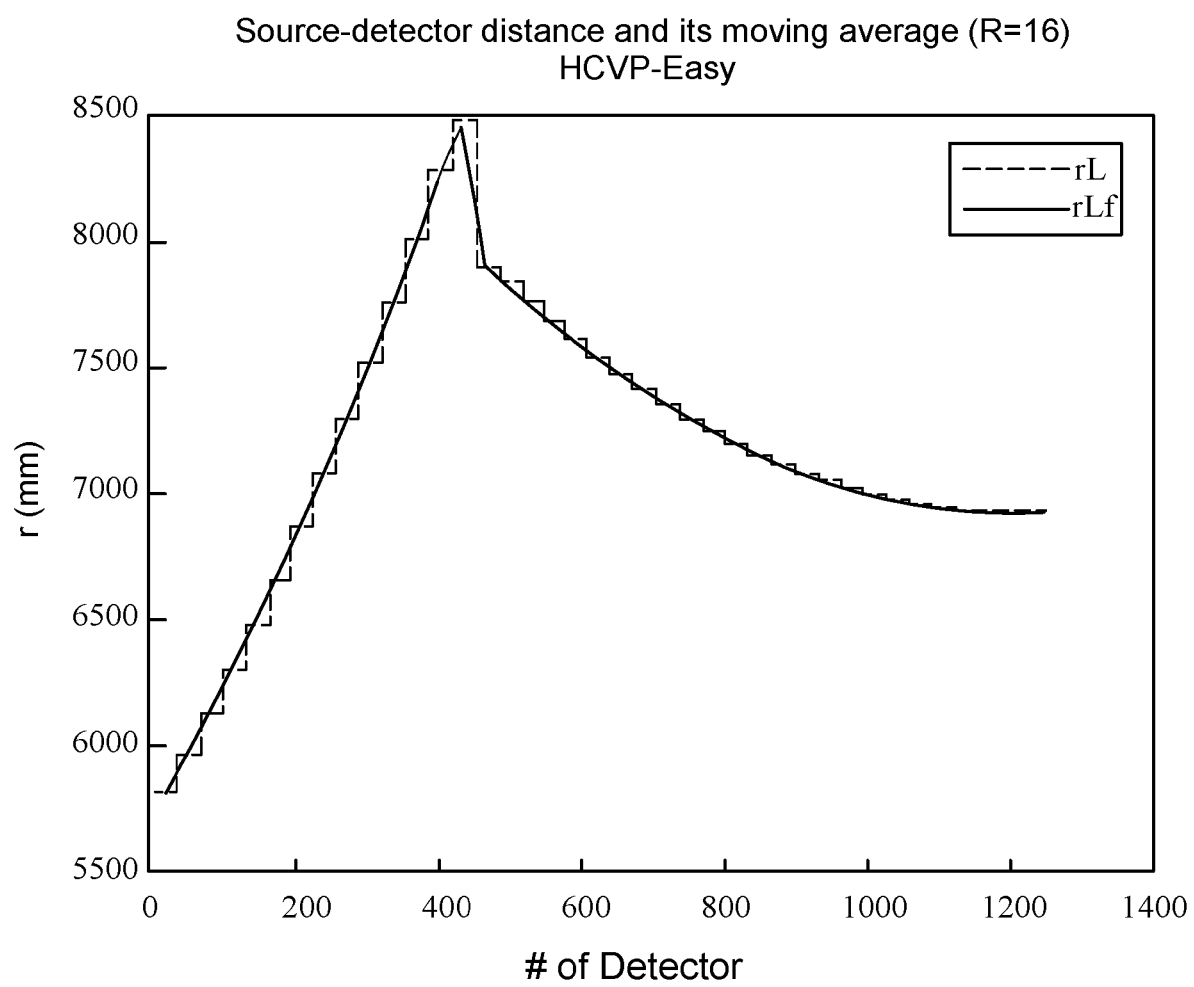
FIG. 10 is a graph showing a distance source-detector $r_L$ and its moving average $r_{Lf}$ as a function of the detectors in the system.

In some examples, $r_{Lf}(i)$ may be determined from $r_L(i)$, which is the distance from the source to the pixel (i) (e.g. in mm), as filtered by a moving average with an adjustable radius R, typically between 16 and 32 pixels, in order to remove strips artifacts. Examples of curves for $r_{Lf}(i)$ and $r_L(i)$ are illustrated by FIG. 10.

From Equations (E10) and (E11), α(i) may thus be determined by:

$$\alpha(i) = \frac{1}{(SNR(i))^2} = \frac{r_{Lf}(i)^2}{\frac{a}{1 + b \cdot (\theta_L(i) - c)^2} + d} \quad \text{(E12)}$$

An example of determination of the Lorentz model is described in US 2014/341342, the disclosure and teachings of which are hereby incorporated in their entirety by reference.

It should be understood that once the three parameters (α(i),µ(i),σ(i)) are determined, for 1≤i≤n, Equation (E1) above may be applied to an inspection image 10 generated by the given system 1, such that.

$$f(z(i)) = \frac{2}{\alpha(i)} \cdot \sqrt{\alpha(i) \cdot z(i) + \frac{3}{8} \cdot \alpha(i)^2 + \sigma(i)^2 - \alpha(i) \cdot \mu(i)} \quad \text{(E2)}$$

$$\text{for } z(i) > -\frac{3}{8} \cdot \alpha(i) - \frac{\sigma(i)^2}{\alpha(i)} + \mu(i)$$

and $$f(z(i)) = 0 \quad \text{(E2)}$$

$$\text{for } z(i) \leq -\frac{3}{8} \cdot \alpha(i) - \frac{\sigma(i)^2}{\alpha(i)} + \mu(i).$$

After the transformation has been applied to the inspection image 10, the transformed image is corrupted by an additive Gaussian noise. The method illustrated in FIG. 1 may further comprise applying, at S3, a denoising filter D to the transformed image f(z(i)). In some examples, D(i) may be a value of the pixel (i) of the denoised image associated with the detector 8(i) of the receiver, after the denoising filter D has been applied to the transformed image, such that:

$$D(i) = D(f(z(i))).$$

In some examples, the denoising filter applied to the transformed image comprises at least a Gaussian-based denoising filter. In some examples, the Gaussian-based denoising filter may use Non-Local Means filtering, such as Block Matching 3-Dimensions (BM3D) filtering, and/or Bilateral filtering, and/or Guided filtering, and/or Anisotropic filtering, and/or Gaussian smoothing.

An example of denoising filter is Block Matching 3-Dimensions, which is described in document "Image denoising by sparse 3D transform domain collaborative filtering", by Dabov and Foi, IEEE Trans. Image Process., vol. 16, no. 8, pp. 2080-2095, August 2007, the disclosure and teachings of which are hereby incorporated in their entirety by reference.

In some examples, in the Block Matching 3-Dimensions (BM3D) filtering, the input noisy transformed image may be processed by successively extracting reference blocks from the transformed image and, for each reference block:
finding blocks (or patches of the image) which are similar to the reference block (sometimes referred to as "block matching");
stacking the found blocks together to form a 3-D group;
performing collaborative filtering of the 3-D group, including 3-D transformation and filtering (such as hard thresholding or Wiener filtering);
performing the inverse of the 3-D transformation;
obtaining a denoised estimate for each block (or patch) in the group; and
returning the obtained 2-D estimates of all grouped blocks to their original locations in the denoised image.

In some examples, some pixels may get multiple estimates from different groups, because after processing all the reference blocks, the obtained block estimates may overlap. These estimates may be aggregated to form an estimate of the whole image, for example by giving a higher weight to more reliable estimates.

The method illustrated in FIG. 1 may further comprise applying, at S4, an inverse of the variance-stabilizing transformation to the denoised image.

In some examples, the inverse of the transform may use an unbiased inverse of the Anscombe transformation of S2.

In some examples, a value Id(i) of the pixel (i) of the denoised image associated with the detector 8(i) of the receiver, after the inverse of the variance-stabilizing transformation has been applied, is determined by:

$$Id(i) = \max\left(0, \frac{1}{4} \cdot D(i)^2 + \frac{1}{4}\sqrt{\frac{3}{2}} \cdot D(i)^{-1} - \frac{11}{8} \cdot D(i)^{-2} + \frac{5}{8}\sqrt{\frac{3}{2}} \cdot D(i)^{-3} - \frac{1}{8} - \sigma(i)^2\right) \cdot \alpha(i) + \mu(i)$$ (E11)

with D(i) the value of the pixel (i) of the denoised image associated with the detector 8(i) of the receiver, after the denoising filter has been applied to the transformed image.

An example of an unbiased inverse of the Anscombe transformation of S2 is described in the document "Optimal inversion of the generalized Anscombe transformation for Poisson-Gaussian noise", by M. Mäkitalo and A. Foi, IEEE Trans. Image Process., vol. 22, no. 1, pp. 91-103, January 2013, the disclosure and teachings of which are hereby incorporated in their entirety by reference.

The method illustrated in FIG. 1 may further comprise, at S5, zooming the inspection image. As explained above, the inspection image has been denoised and the denoised image may be zoomed. The zooming may help the user to detect the hidden objects in the zoomed image, as the zoomed image is also denoised.

As described in further detail below, in some examples zooming may comprise applying bilinear or bicubic interpolations, and/or an upsampling using a deconvolution-based technique. In some examples, zooming may further comprise applying a feedback loop after the upsampling using the deconvolution-based technique has been applied. In some examples, applying the feedback may comprise:
applying a convolution-based technique; and
applying a pixel substitution.

Figures 11A, 11B:
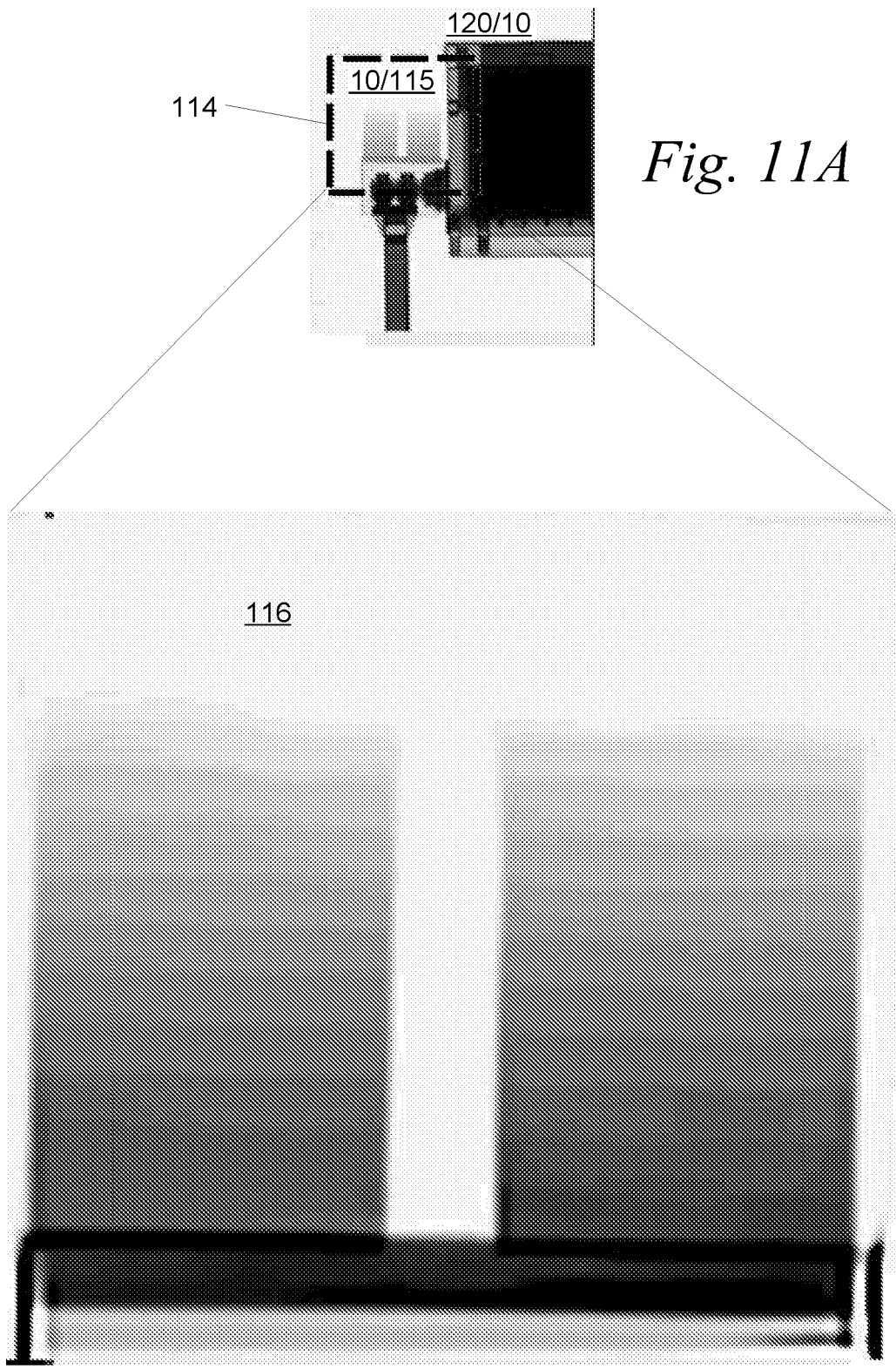
FIG. 11A represents a selected zone of interest in an image.
FIG. 11B represents a zoomed image corresponding to the zone of interest of FIG. 11A.

As shown in FIG. 11A, in an example, the received inspection image 10 discussed above corresponds to a selected zone of interest 114 in an image 120 generated by the inspection system. In such an example, S2, S3, S4 and S5, as discussed above and described with reference to FIG. 1, may be performed for the inspection image 10 corresponding to the selected zone 114 of interest only, selected in the otherwise noisy image 120. In such an example, processing and computing may thus be reduced, as performed for the image 10 only.

As shown in FIG. 11A, in an example, zooming the inspection image comprises zooming a part 115 of the inspection image 10. In the example of FIG. 11A, the part 115 corresponds to the zone of interest 114 in the inspection image 10. In such an example, the selection of the part 115 may be performed after the whole inspection image 10 has been denoised, i.e. after S2, S3 and S4 have been performed on the whole image 10, S5 being performed for the zone 115 only. In such an example, the detection of the hidden objects may be enhanced, as the denoising may facilitate the selection of the part 115 to be zoomed as a zoomed zone 116 as shown in FIG. 11B.

In some examples, the zone 114 of interest may be selected, e.g. based on an input associated with the zone 114 of interest. The input associated with the zone 114 of interest may be received by the denoiser and/or zoom 50 illustrated in FIG. 2. In such an example, the input may be provided by the user of the denoiser and/or zoom 50, e.g. using the Graphical User Interface 55 (as shown in FIG. 2), and/or by the system 1. In some examples, the selection of the zone 114 may be performed at least partly automatically by the denoiser and/or zoom 50.

Figure 12:
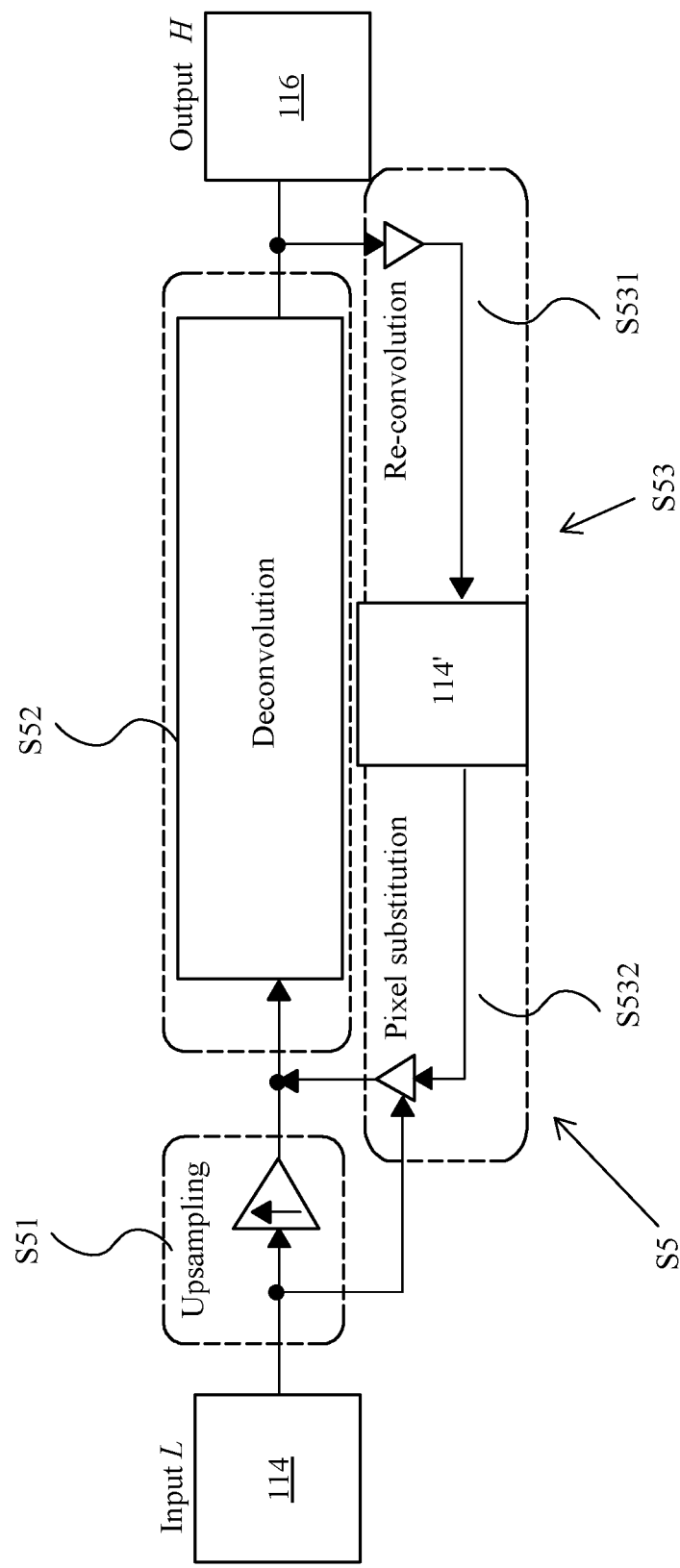
FIG. 12 represents an example of a deconvolution-based zooming.

FIG. 12 shows an example of a zooming of S5 comprising applying an example of a deconvolution-based technique.

The deconvolution-based technique illustrated by FIG. 12 comprises:
upsampling, at S51, the zone 114 of interest, and
applying, at S52, a deconvolution-based technique to the upsampled zone of interest to obtain the zoomed zone 116.

The example of FIG. 12 further comprises optionally applying, at S53, a feedback loop to the upsampled zone of interest once the deconvolution-based technique has been applied The applying, at 53, of the feedback illustrated in FIG. 12 comprises:
applying, at S531, a convolution-based technique to the upsampled zone of interest once the deconvolution-based technique has been applied, to obtain an additional zone of interest 114'; and
applying, at S532, a pixel substitution to the upsampled zone 114' of interest.

The upsampled zone 114' with the pixel substitution may be aggregated with the upsampled zone 114.

An example of deconvolution-based technique of S5 is described in the document "Fast Image/Video Upsampling", by Q. Shan et al., ACM Trans. on Graphics, vol. 27, no. 5, Article 153, December 2008, the disclosure and teachings of which are hereby incorporated in their entirety by reference.

Modifications and Variations

The radiation source is configured to cause inspection of cargo through the material (usually steel) of walls of the container, e.g. for detection and/or identification of the cargo. Alternatively or additionally, the inspection radiation may be transmitted through the load (the material of the load being thus transparent to the radiation), while the radiation may, at least partly, be reflected by the load (the material and/or composition of the load located being thus only partly transparent to the radiation, and partly reflective to the radiation—in that case, detectors may be placed to receive the radiation reflected by the load).

As explained in greater detail below, in some examples, the inspection system 1 may be mobile and may be transported from a location to another location (the system 1 may comprise an automotive vehicle). Alternatively or additionally, the inspection system 1 may be static with respect to the ground and cannot be displaced.

The electrons are generally accelerated under a voltage comprised between 100 keV and 15 MeV. The dose of the radiation may be comprised between 2 mGy (Gray) and 20 Gy.

In mobile inspection systems, the power of the X-ray source 2 may be e.g., between 100 keV and 9.0 MeV, typically e.g., 300 keV, 2 MeV, 3.5 MeV, 4 MeV, or 6 MeV, for a steel penetration capacity e.g., between 40 mm to 400 mm, typically e.g., 300 mm (12 in). In static inspection systems, the dose may be e.g., between 20 mGy and 120 mGy.

In static inspection systems, the power of the X-ray source 2 may be e.g., between 4 MeV and 10 MeV, typically e.g., 9 MeV, for a steel penetration capacity e.g., between 300 mm to 450 mm, typically e.g., 410 mm (16.1 in). In static inspection systems, the dose may be 17 Gy.

In some examples, the x-ray source 2 may emit successive x-ray pulses. The pulses may be emitted at a given frequency, comprised between 50 Hz and 1000 Hz, for example approximately 200 Hz.

According to some examples, the detectors 8 may be mounted on a gantry 38, as shown in FIG. 5. The gantry 38 for example forms an inverted "L" extending in a median plane XOY. In mobile inspection systems, the gantry 38 may comprise an electro-hydraulic boom which can operate in a retracted position in a transport mode (not illustrated in the Figures) and in an inspection position (FIG. 5). The boom may be operated by hydraulic activators (such as hydraulic cylinders).

In static inspection systems, the gantry 38 may comprise a static structure.

It should be understood that the inspection radiation source may comprise sources of other radiation, such as, as non-limiting examples, sources of ionizing radiation, for example gamma rays or neutrons. The inspection radiation source may also comprise sources which are not adapted to be activated by a power supply, such as radioactive sources, such as using Co60 or Cs137.

In some examples, the inspection system may comprise other types of detectors, such as optional gamma and/or neutrons detectors, e.g., adapted to detect the presence of radioactive gamma and/or neutrons emitting materials within the load, e.g., simultaneously to the X-ray inspection.

In the context of the present disclosure, the container 110 may be any type of container, such as a holder, a vessel, or a box, etc. The container 110 may thus be, as non-limiting examples, a trailer and/or a palette (for example a palette of European standard, of US standard or of any other standard) and/or a train wagon and/or a tank and/or a boot of a vehicle such as a truck, a van and/or a car and/or a train, and/or the container 110 may be a "shipping container" (such as a tank or an ISO container or a non-ISO container or a Unit Load Device (ULD) container). It is thus appreciated that the container 110 may be any type of container, and thus may be a suitcase in some examples.

The system 1 is configured to, in the inspection mode, cause inspection of the load, in totality (i.e. the whole load is inspected) or partially (i.e. only a chosen part of the container is inspected, e.g., typically, when inspecting a vehicle, a cabin of the vehicle may not be inspected, whereas a rear part of the vehicle is inspected).

In order to inspect the load, the system 1 may comprise a motion generation device so that the system 1 may be displaced, the load being static with respect to the ground (this mode is sometimes referred to as a 'scanning' mode). Alternatively or additionally, the motion generation device may cause the load to be displaced, the system 1 being static with respect to the ground. In some embodiments, the throughput, i.e. the number of load inspected by unit of time, may be of 20 to 30 images/hour.

Alternatively or additionally, in a 'pass-through' mode the system 1 does not comprise a motion generation device and the load 11 moves with respect to the system 1, the system 1 being static with respect to the ground. In embodiments, the throughput in the pass-through mode may be higher than the throughput in the scanning mode, and may be for example of 50 to 200 images/hour, or even of 50 to a few thousands images/hour in the case of an inspection of a passing train (for example a throughput of more than 1000 images/hour).

Other variations and modifications of the system or the analyser will be apparent to the skilled in the art in the context of the present disclosure, and various features described above may have advantages with or without other features described above.

For example, the denoiser and/or zoom 50 may, at least partly, form a part of the inspection system 1. For example, the server 61 may, at least partly, form a part of the denoiser and/or zoom 50.

As one possibility, there is provided a computer program, computer program product, or computer readable medium, comprising computer program instructions to cause a programmable computer to carry out any one or more of the methods described herein. In example implementations, at least some portions of the activities related to the denoiser and/or zoom 50 and/or the links 60 and/or 70 herein may be implemented in software. It is appreciated that software components of the present disclosure may, if desired, be implemented in ROM (read only memory) form. The software components may, generally, be implemented in hardware, if desired, using conventional techniques. In some examples, components of the denoiser and/or zoom 50 and/or the links 60 and/or 70 may use specialized applications and hardware.

As will be apparent to the skilled in the art, the server 61 should not be understood as a single entity, but rather refers to a physical and/or virtual device comprising at least a processor and a memory, the memory may be comprised in one or more servers which can be located in a single location or can be remote from each other to form a distributed network (such as "server farms", e.g., using wired or wireless technology).

In some examples, one or more memory elements (e.g., the database and/or the memory of the processor) can store data used for the operations described herein. This includes the memory element being able to store software, logic, code, or processor instructions that are executed to carry out the activities described in the disclosure.

A processor can execute any type of instructions associated with the data to achieve the operations detailed herein in the disclosure. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

The links 60 and/or 70 may form only one network.

The data received by the denoiser and/or zoom 50 may be typically received over a range of possible communications networks, at least such as: a satellite based communications network; a cable based communications network; a telephony based communications network; a mobile-telephony based communications network; an Internet Protocol (IP) communications network; and/or a computer based communications network.

In some examples, the denoiser and/or zoom 50 and/or the links 60 and/or 70 may comprise one or more networks. Networks may be provisioned in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network.

The above embodiments are to be understood as illustrative examples, and further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of denoising one or more inspection images, comprising:
   receiving an inspection image comprising a plurality of pixels, the inspection image generated by an inspection system configured to inspect one or more containers, wherein the inspection system is configured to inspect the container by transmission, through the container, of inspection radiation having an angular divergence from an inspection radiation source to an inspection radiation receiver comprising a plurality of detectors, the inspection image being corrupted by a Poisson-Gaussian noise and a variance of the noise being non-constant in the plurality of pixels, and
   denoising the received inspection image by applying, to the inspection image, a variance-stabilizing transformation for transforming the variance of the noise into a constant variance in the plurality of pixels, wherein the variance-stabilizing transformation is based on a descriptor associated with the angular divergence of the inspection radiation and the Poisson-Gaussian noise, and wherein the variance-stabilizing transformation is based on a predetermined set of parameters, the descriptor comprising an n×p matrix, with n a number of detectors in the plurality of detectors and p a number of parameters of the variance-stabilizing transformation.

2. The method of claim 1, wherein the descriptor is associated with each pixel of the plurality of pixels of the inspection image.

3. The method of claim 1, wherein the variance-stabilizing transformation comprises an Anscombe transformation f, based on a predetermined set of three parameters ($\alpha(i),\mu(i),\sigma(i)$), defined by, for a value z(i) of a pixel of the inspection image associated with a detector (i) of the receiver:

$$f(z(i)) = \begin{cases} \frac{2}{\alpha(i)} \cdot \sqrt{\alpha(i) \cdot z(i) + \frac{3}{8} \cdot \alpha(i)^2 + \sigma(i)^2 - \alpha(i) \cdot \mu(i)} & \text{for} \\ 0 \end{cases}$$

$$\begin{cases} z(i) > -\frac{3}{8} \cdot \alpha(i) - \frac{\sigma(i)^2}{\alpha(i)} + \mu(i) \\ z(i) \leq -\frac{3}{8} \cdot \alpha(i) - \frac{\sigma(i)^2}{\alpha(i)} + \mu(i) \end{cases}$$

with:
   $\alpha(i)$, a gain factor associated with a detector (i) of the receiver,
   $\mu(i)$, a mean associated with the noise, and
   $\sigma(i)$, a standard deviation associated with the noise.

4. The method of claim 1, further comprising determining the descriptor during a calibration step, for a given inspection system.

5. The method of claim 4, wherein the variance-stabilizing transformation comprises an Anscombe transformation f, based on a predetermined set of three parameters ($\alpha(i),\mu(i),\sigma(i)$), defined by, for a value z(i) of a pixel of the inspection image associated with a detector (i) of the receiver:

$$f(z(i)) = \begin{cases} \frac{2}{\alpha(i)} \cdot \sqrt{\alpha(i) \cdot z(i) + \frac{3}{8} \cdot \alpha(i)^2 + \sigma(i)^2 - \alpha(i) \cdot \mu(i)} & \text{for} \\ 0 \end{cases}$$

$$\begin{cases} z(i) > -\frac{3}{8} \cdot \alpha(i) - \frac{\sigma(i)^2}{\alpha(i)} + \mu(i) \\ z(i) \leq -\frac{3}{8} \cdot \alpha(i) - \frac{\sigma(i)^2}{\alpha(i)} + \mu(i) \end{cases}$$

with:
   $\alpha(i)$, a gain factor associated with a detector (i) of the receiver,
   $\mu(i)$, a mean associated with the noise, and
   $\sigma(i)$, a standard deviation associated with the noise, and
   wherein a predetermined set of three parameters ($\alpha1(i),\mu1(i),\sigma1(i)$) of the descriptor is determined, for the given inspection system, based on a series of calibration images generated by the given system, the determination of the predetermined set of three parameters ($\alpha1(i),\mu1(i),\sigma1(i)$) of the descriptor comprising:
      obtaining a cloud of points with reference to a $\sigma$ axis and a $\mu$ axis, each point of the cloud corresponding to a standard deviation $\sigma(i)$ associated with a noise in a pixel (i), as a function of the mean $\mu(i)$ associated with the noise in the pixel (i), for a series of pixels in the series of calibration images; and approximating the cloud of points by a straight line, where:

α1(i) is the slope of the straight line;

σ1(i) is the intersection of the straight line with the σ axis; and

μ1(i) is the intersection of the straight line with the μ axis.

6. The method of claim 1, further comprising determining the descriptor during a pre-processing step, for pre-processing images from the detectors, wherein the pre-processing step comprises determining at least one of an offset, an offset correction, a gain, a gain correction, a reference, or a reference correction.

7. The method of claim 6, wherein the variance-stabilizing transformation comprises an Anscombe transformation f, based on a predetermined set of three parameters (α(i),μ(i),σ(i)), defined by, for a value z(i) of a pixel of the inspection image associated with a detector (i) of the receiver:

$$f(z(i)) = \begin{cases} \frac{2}{\alpha(i)} \cdot \sqrt{\alpha(i) \cdot z(i) + \frac{3}{8} \cdot \alpha(i)^2 + \sigma(i)^2 - \alpha(i) \cdot \mu(i)} & \text{for} \\ 0 \end{cases}$$

$$\begin{cases} z(i) > -\frac{3}{8} \cdot \alpha(i) - \frac{\sigma(i)^2}{\alpha(i)} + \mu(i) \\ z(i) \leq -\frac{3}{8} \cdot \alpha(i) - \frac{\sigma(i)^2}{\alpha(i)} + \mu(i) \end{cases}$$

with:

α(i), a gain factor associated with a detector (i) of the receiver,

μ(i), a mean associated with the noise, and

σ(i), a standard deviation associated with the noise, and wherein σ(i) is determined by:

$$\alpha(i) = \frac{r_{Lf}(i)^2}{\frac{a}{1 + b \cdot (\theta_L(i) - c)^2} + d}$$

with: $\theta_L$, a, b, c and d being determined by a Lorentz model of an angular signature of the angular divergence of the source; and $r_{Lf}$, being a moving average of a distance from the source to the detector (i).

8. The method of claim 6, wherein the variance-stabilizing transformation comprises an Anscombe transformation f, based on a predetermined set of three parameters (α(i),μ(i),σ(i)), defined by, for a value z(i) of a pixel of the inspection image associated with a detector (i) of the receiver:

$$f(z(i)) = \begin{cases} \frac{2}{\alpha(i)} \cdot \sqrt{\alpha(i) \cdot z(i) + \frac{3}{8} \cdot \alpha(i)^2 + \sigma(i)^2 - \alpha(i) \cdot \mu(i)} & \text{for} \\ 0 \end{cases}$$

$$\begin{cases} z(i) > -\frac{3}{8} \cdot \alpha(i) - \frac{\sigma(i)^2}{\alpha(i)} + \mu(i) \\ z(i) \leq -\frac{3}{8} \cdot \alpha(i) - \frac{\sigma(i)^2}{\alpha(i)} + \mu(i) \end{cases}$$

with:

α(i), a gain factor associated with a detector (i) of the receiver,

μ(i), a mean associated with the noise, and

σ(i), a standard deviation associated with the noise, and wherein μ(i) is assumed to be null:

$$\mu(i)=0.$$

9. The method of claim 6, wherein the variance-stabilizing transformation comprises an Anscombe transformation f, based on a predetermined set of three parameters (α(i),μ(i),σ(i)), defined by, for a value z(i) of a pixel of the inspection image associated with a detector (i) of the receiver:

$$f(z(i)) = \begin{cases} \frac{2}{\alpha(i)} \cdot \sqrt{\alpha(i) \cdot z(i) + \frac{3}{8} \cdot \alpha(i)^2 + \sigma(i)^2 - \alpha(i) \cdot \mu(i)} & \text{for} \\ 0 \end{cases}$$

$$\begin{cases} z(i) > -\frac{3}{8} \cdot \alpha(i) - \frac{\sigma(i)^2}{\alpha(i)} + \mu(i) \\ z(i) \leq -\frac{3}{8} \cdot \alpha(i) - \frac{\sigma(i)^2}{\alpha(i)} + \mu(i) \end{cases}$$

with:

α(i), a gain factor associated with a detector (i) of the receiver,

μ(i) a mean associated with the noise, and

σ(i), a standard deviation associated with the noise, and wherein σ(i) is determined by:

$$\sigma(i) = \frac{\sigma \text{off}(i)}{\text{Gain}(i)}$$

with: σoff(i) being determined based on a time standard deviation of an offset image acquired in a calibration image generated by the inspection system, and Gain(i) being determined based on a time mean of an offset-corrected gain image generated by the inspection system.

10. The method of claim 1, further comprising applying a denoising filter to an image transformed by the variance-stabilizing transformation.

11. The method of claim 10, wherein the denoising filter comprises at least a Gaussian-based denoising filter.

12. The method of claim 10, further comprising applying an inverse of the variance-stabilizing transformation to an image denoised by the denoising filter.

13. The method of claim 12, wherein the inverse of the transform uses an unbiased inverse of the Anscombe transformation.

14. The method of claim 13, wherein the variance-stabilizing transformation comprises an Anscombe transformation f, based on a predetermined set of three parameters ($\alpha(i),\mu(i),\sigma(i)$), defined by, for a value z(i) of a pixel of the inspection image associated with a detector (i) of the receiver:

$$f(z(i)) = \begin{cases} \frac{2}{\alpha(i)} \cdot \sqrt{\alpha(i) \cdot z(i) + \frac{3}{8} \cdot \alpha(i)^2 + \sigma(i)^2 - \alpha(i) \cdot \mu(i)} & \text{for} \\ 0 \end{cases}$$

$$\begin{cases} z(i) > -\frac{3}{8} \cdot \alpha(i) - \frac{\sigma(i)^2}{\alpha(i)} + \mu(i) \\ z(i) \leq -\frac{3}{8} \cdot \alpha(i) - \frac{\sigma(i)^2}{\alpha(i)} + \mu(i) \end{cases}$$

with:
- $\alpha(i)$, a gain factor associated with a detector (i) of the receiver,
- $\mu(i)$, a mean associated with the noise, and
- $\sigma(i)$, a standard deviation associated with the noise, and wherein a value Id(i) of a pixel of the denoised image associated with the detector (i) of the receiver, after the inverse of the variance-stabilizing transformation has been applied, is determined by:

$$Id(i) = \max\left(0, \frac{1}{4} \cdot D(i)^2 + \frac{1}{4}\sqrt{\frac{3}{2}} \cdot D(i)^{-1} - \frac{11}{8} \cdot D(i)^{-2} + \frac{5}{8}\sqrt{\frac{3}{2}} \cdot D(i)^{-3} - \frac{1}{8} - \sigma(i)^2\right) \cdot \alpha(i) + \mu(i)$$

with D(i) being a value of a pixel of the denoised image associated with the detector (i) of the receiver, after the denoising filter has been applied to the transformed image.

15. The method of claim 12, further comprising zooming the inspection image.

16. The method claim 15, wherein zooming the inspection image comprises zooming a part of the inspection image corresponding to a zone of interest.

17. The method of claim 1, wherein the inspection image is defined by a zone of interest.

18. A denoiser for denoising one or more inspection images, the denoiser comprising:
- a memory configured to store at least one of control data, parameters, or instructions; and
- a processor communicatively coupled to the memory, the processor operable to execute the at least one of control data, parameters, or instructions to:
  - receive an inspection image comprising a plurality of pixels, the inspection image generated by an inspection system configured to inspect one or more containers, wherein the inspection system is configured to inspect the container by transmission, through the container, of inspection radiation having an angular divergence from an inspection radiation source to an inspection radiation receiver comprising a plurality of detectors, the inspection image being corrupted by a Poisson-Gaussian noise and a variance of the noise being non-constant in the plurality of pixels, and
  - denoise the received inspection image by applying, to the inspection image, a variance-stabilizing transformation for transforming the variance of the noise into a constant variance in the plurality of pixels, wherein the variance-stabilizing transformation is based on a descriptor associated with the angular divergence of the inspection radiation and the Poisson-Gaussian noise, and wherein the variance-stabilizing transformation is based on a predetermined set of parameters, the descriptor comprising an n×p matrix, with n a number of detectors in the plurality of detectors and p a number of parameters of the variance-stabilizing transformation.

19. A non-transitory computer program product comprising program instructions to program a processor to carry out data processing for denoising one or more inspection images, the program instructions comprising:
- receiving an inspection image comprising a plurality of pixels, the inspection image generated by an inspection system configured to inspect one or more containers, wherein the inspection system is configured to inspect the container by transmission, through the container, of inspection radiation having an angular divergence from an inspection radiation source to an inspection radiation receiver comprising a plurality of detectors, the inspection image being corrupted by a Poisson-Gaussian noise and a variance of the noise being non-constant in the plurality of pixels, and
- denoising the received inspection image by applying, to the inspection image, a variance-stabilizing transformation for transforming the variance of the noise into a constant variance in the plurality of pixels, wherein the variance-stabilizing transformation is based on a descriptor associated with the angular divergence of the inspection radiation and the Poisson-Gaussian noise, and wherein the variance-stabilizing transformation is based on a predetermined set of parameters, the descriptor comprising an n×p matrix, with n a number of detectors in the plurality of detectors and p a number of parameters of the variance-stabilizing transformation,
- wherein the computer program product is configured to be executed by at least one of a denoiser or a zoom.

* * * * *